Oct. 31, 1972         J. C. JACKSON         3,701,699
METHOD OF HEAT SEALING A PEELABLE COVER ONTO A CONTAINER
Filed Aug. 11, 1969
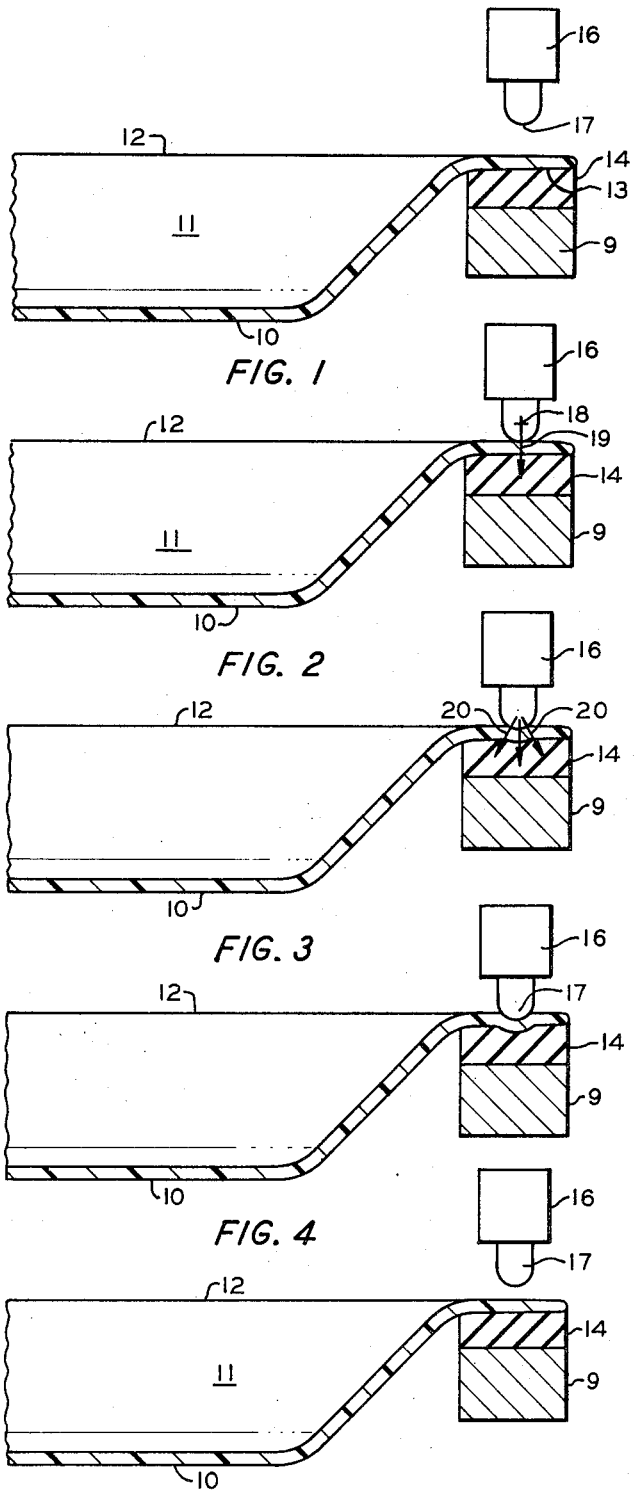
INVENTOR.
J. C. JACKSON
BY
ATTORNEYS – # United States Patent Office 3,701,699
Patented Oct. 31, 1972

3,701,699
METHOD OF HEAT SEALING A PEELABLE COVER ONTO A CONTAINER
James C. Jackson, Kansas City, Mo., assignor to Phillips Petroleum Company
Filed Aug. 11, 1969, Ser. No. 848,910
Int. Cl. B29c 27/00
U.S. Cl. 156—69                                      4 Claims

ABSTRACT OF THE DISCLOSURE

A cover adapted to be removed by peeling is sealed to a container by depressing a cover of heat sealable material and a substantially flat, peripheral container edge of heat sealable material together with a force that is substantially perpendicular to the area being depressed.

---

This invention relates to a method of sealing a peelable cover on a container.

In modern merchandising it is desirable to package certain types of products, such as food products, in attractive protective packages with a cover that will peel off. One widely used packaging technique for food is to thermoform a container out of a plastic sheet, fill the recess with the material to be packaged, and then seal a peelable cover around the edges of the container.

In order to produce a finished package with a cover of satisfactory peeling qualities, the seal between the cover and container must possess certain characteristics. The cover must be sealed to the container with a seal that is of substantially uniform strength at every point across the seal. If the cover is sealed so the seal is strong in some places and weak in others, the peelable feature will be destroyed because the cover will shred and break due to shear stress when it is removed by peeling. The marketability of the peelable cover that shreds and tears is substantially reduced as opposed to a peelable cover that will release from the container uniformly and smoothly without tearing and shredding.

Prior attempts to securely seal a peelable cover to a container were confined to attempts to depress and heat seal the cover and container edge generally perpendicular to the undepressed portions of the cover and container edge. Examples of sealing a cover to a container in this manner include use of a rigid flat tool. This method using the rigid flat tool in many instances is unsatisfactory when used in conjunction with either a rigid or resilient die. Thus, in this method as the rigid tool contacts the cover, the small area of cover and container directly under the tool is depressed into a grooved die with a force that is acting perpendicular to the cover and container edges. However, as the tool depresses farther into the die the portion of the cover and container that are not directly under the tool are depressed; but the depressing force, while still perpendicular to the undepressed portion of the cover and container edge, is no longer perpendicular to the portion of the cover and container edge being depressed and sealed. Thus, the sealing pressure is greatest in the areas of the cover and edge not directly under the sealing tool because the cover and container edge are being "squeezed" into a groove by the tool. The result of this technique is a seal that is very strong around each edge, but weak in the center of the seal. As has been noted, this characteristic is perfectly satisfactory for many applications but is entirely unsatisfactory for producing a peelable cover.

This invention thus broadly comprises a method of heat sealing a peelable cover over a container by depressing, with a rigid arcuate tool, the cover and a substantially flat, peripheral, heat sealable container edge into a resilient die member so as to produce a depressing force that is always directly generally perpendicular to the portion of said cover and edge being depressed. Thus, since the force is always perpendicular to the area being depressed, the bond is substantially uniform across the seal and an entirely satisfactory peelable cover is produced. In a preferred embodiment the center portion of the edge is depressed.

Thus, in one embodiment, this invention comprises a method whereby a thermoformed plastic tray or container is filled with a packaged product and the cover is placed over the filled container. A rigid heated sealing tool of arcuate construction advances and deforms the edge of the container and that portion of the cover over the edge into the resilient die member. This heat seals the cover sheet to the container and forms a very uniform seal because as noted earlier the arcuate sealing tool deforms the cover and container edge so that the depressing force is always perpendicular to the portion of the cover and container edge being depressed. The heat from the sealing function can be adjusted to cause the cover and container edge to become permanently deformed or the heat can be adjusted to allow the container edge to be restored to its original flat configuration after the sealing tool is withdrawn from the die member. Thus, in either case when the sealing tool is withdrawn the cover sheet has been securely sealed to the container and cover.

Accordingly, it is an object of this invention to provide a method of sealing the cover to a container by depressing the cover and container edge with a force acting perpendicular to the portion of the cover and container edge being depressed.

Other objects, advantages, and features of this invention will be readily apparent to those skilled in the art from the following description, drawing, and appended claims.

The attached figures represent one embodiment of the invention.

FIG. 1 represents the container after it has been filled and the cover applied but not sealed to the container.

FIG. 2 represents the sealing tool moving down to sealing position wherein the sealing tool has just touched but not deformed the cover and container edge.

FIG. 3 represents the container edge and cover being deformed by the sealing tool. The cover sheet is being sealed during this step.

FIG. 4 represents the container edge and cover at maximum deformation as the sealing tool has advanced to its downwardmost position.

FIG. 5 represents the cover peelably sealed to the container after the container edge has returned to a flat condition due to its elasticity.

Thus, in FIG. 1 there is illustrated container 10 which can comprise any container that will permanently deform at the edges and bond to a cover when the edges are subjected to deformation and heat. Container 10 must, however, be equipped with substantially flat peripheral edges suitable for bonding a cover thereto. Particularly, containers made from thermoformable polyolefin substrates are suitable for use in this invention. More specifically, substrates constructed of polyvinyl chloride, polystyrene, polypropylene, and polyethylene are entirely satisfactory for use in this invention. In one embodiment, containers were thermoformed from a substrate of polyethylene made according to the method of Hogan and Banks, U.S. 2,825,721.

Additionally, indicated in FIG. 1 is a product 11 packaged according to this invention. Any product that will not chemically or physically destroy the package media can be used in the invention. Specifically, food products are applicable for use in this invention.

Additionally, there is indicated in FIG. 1 cover 12. Cover 12 can comprise any transparent or nontransparent material possessing properties permitting it to be bonded to container 10 by the application of heat. Obviously, a satisfactory cover material will depend upon the material from which the container is to be constructed, since a thermally induced bonding is necessary according to this invention. Specifically, polyethylene or polyethylene bonded to cellophane on a polyester film is a satisfactory transparent cover material. Additionally, paper laminated to polyethylene provides a satisfactory nontransparent cover material as do laminates of polyethylene to polyesters or polyamide or to metal foils such as alminum foil and laminates of aluminum foil to paper to polyethylene. If desired, labels, trademarks, and similar messages can be printed on the cover.

With specific reference to FIG. 1, there is indicated the flat edge 13 of container 10 being placed on a resilient die member 14 which in this embodiment is secured by a support 9. Die member 14 can be constructed of any resilient material that will produce an operable seal when this invention is practiced. Although many types of rubber-like products are useful, according to a preferred embodiment of this invention, member 14 comprises a silicone rubber. Also according to a preferred embodiment of the invention, member 14 corresponds to the geometry of the container itself and completely encircles the outside of the container. The above embodiment is preferred so the cover can be sealed in one single operation.

Also, in FIG. 1, there is illustrated sealing tool 16 having a sealing tool projection 17. Sealing tool 16 is attached to a means to move the tool toward member 14 in a reciprocating motion. In this embodiment, the center portion of the container edge is being depressed although it is fully within the scope of this invention to form the seal by depressing any portion of the edge.

FIG. 2 indicates the sealing operation ready to be accomplished after the container has been filled with a packaging material and cover placed thereon.

As discussed earlier, according to this invention the cover and container edge are depressed by a depressing force that is perpendicular to the portion of the cover and container edge being depressed. Thus, the end of sealing tool projection 17 is of arcuate construction and the center of the circle from which the arc was taken is designated as 18. Thus, when the sealing tool projection advances the depressing force will always be radial to the circle whose center is 18, and consequently, by virtue of the cooperation between the rigid sealing tool projection and the resilient die member, the depressing force acts radially from 18 and will always be perpendicular to the portion of cover and container edge being depressed.

As will be also noted in FIG. 2, sealing tool 16 has descended downwardly only so far as to touch but not deform the container edge and cover. Obviously, at this point the depressing force 19 is acting substantially perpendicular to the cover and container edge.

The radius of the arcuate sealing tool projection 17 can comprise any radius suitable for use with this invention and in one embodiment was ⅜″. The projection can be advanced any distance into die member 14, thus, further advancement of the projection than that where the depressing force is no longer perpendicular to the portion of the cover and container edge being depressed can be used if desired.

While the width of the seal can vary greatly depending on the radius used and the depth of depression, in one embodiment a width of ³⁄₃₂″ was used. In this embodiment the sealing tool projection 17 was of ⅜″ radius. Of course, other sizes of sealing tool projections can be used and other seal widths made without departing from the scope of this invention.

FIG. 3 illustrates the sealing tool projection farther advanced during the depressing operation. As noted earlier, as the tool advances the projection cooperates with the resilient die member so as to produce a depressing force perpendicular to the portion of the cover and container edge being depressed. Thus, the depressing force depicted as 20 in FIG. 3 is perpendicular to the area being depressed.

FIG. 4 illustrates the sealing tool in the most advanced position into the resilient die member wherein the entire arcuate face of the projection is substantially in contact with the cover. Further advancement of the projection into the resilient member is fully within the scope of this invention and can be used if desired.

After the desired deformation has been accomplished, container edge 13 and cover sheet 12 are heated as a result of sealing tool 16 and sealing tool projection 17 being maintained at a sufficient temperature to seal cover sheet 12 to container edge 13. The temperature required to be maintained in sealing tool projection 17 so as to properly bond cover sheet 12 to container edge 13 without damaging either the cover sheet or container edge will depend on the material selected by the user. Generally, a temperature of from 290° to 500° F., preferably from 320°–400° F., can be maintained in sealing tool projection 17 although higher and lower temperatures are possible. In one embodiment, the sealing tool was maintained at 350° F.

Sealing tool projection 17 must remain in a position of deforming the cover sheet and container edge for a length of time sufficient to transfer heat from sealing tool projection 17 through cover sheet 12 to container edge 13. The length of time required will vary with the temperature to be maintained in sealing tool projection 17 and the materials selected for the container and cover sheet. The time the sheet 12 and container edge 13 are held in the deformed and heat sealing position is preferably in the range of from 0.2 second to 4 seconds, more preferably from 0.6 second to 1.5 seconds. In one embodiment, sealing tool projection 17 was held in the deforming and heat sealing position for 1.25 seconds.

As will be noted by referring to FIG. 5, container edge 13 can be allowed to utilize its inherent elasticity to spontaneously restore itself to its original flattened condition by controlling the temperature of sealing tool projection 17 and the sealing residence time. In an alternate embodiment (not shown) where the container edge is caused to permanently deform, the cover will be more taut than when the edge is allowed to totally recover to its flattened condition. Additional varying amounts of recovery after the deforming step can be tolerated depending upon the elasticity of the cover sheet 12. Also, it is to be noted that according to this invention when the sealing tool projection is removed, the edge of the container, whether permanently deformed or not, "pops" out of the resilient material automatically, thus eliminating the problem of the container edge sticking in a nonresilient die.

This invention is thus broadly applicable to heat sealing a peelable cover over a container.

Various modifications of this invention can be made in view of the foregoing disclosure and the appended claims without departing from the spirit or scope thereof.

EXAMPLE

A container for packaging food products was constructed by thermoforming a flat sheet of polyethylene, made according to the method of Hogan and Banks, U.S. 2,825,721, into a sloping-walled rectangular tub 5¼″ long by 4¼″ wide by 1″ deep with a flat peripheral or flange 0.015″ thick and about ¼″ wide. This container was then placed within a framework of resilient silicone rubber supported on a metal frame which caused the peripheral edges of said container to reside on the silicone rubber. The container was then filled with a suitable filling and a 1½ mil thick polyethylene coated cover of polyamide was placed over the filled container with the polyethylene surface of the cover in contact with the container surface. A sealing tool, having a projection with an arcuate face of 150° arc and a radius of ⅜" was advanced into the cover and container edge. The sealing tool projection was maintained at a temperature of 350° F. and held in the depressed state for 1.25 seconds. As a result a seal ³⁄₃₂" wide was made.

The package was then tested for peelable characteristics and it was found that the cover peeled off the container with a smooth pull. No tearing and shredding of the cover was observed.

What is claimed is:

1. A method of peelably sealing a cover over a container comprising the steps of:
    (a) positioning a container with a substantially flat peripheral edge of heat sealable material so as to place said edge over a substantially flat resilient die member;
    (b) positioning a cover of heat sealable material over said peripheral edge of said container;
    (c) depressing said cover and said container edge into said resilient die member with a rigid tool having an arcuate face so as to produce a depressing force substantially perpendicular to the entire portion of said cover and edge being depressed; and
    (d) heating the depressed portions of said cover and container edge to a heat sealing temperature to bond the cover to the container edge, whereby the bond is at least substantially uniform throughout the area of the bond so that said cover can be peeled from said container uniformly and smoothly without tearing.

2. The method of claim 1 wherein said container edge and said cover comprises polyethylene.

3. The method of claim 1 wherein said container comprises a recessed container.

4. The method of claim 1 wherein the center portion of said container edge is depressed.

References Cited

UNITED STATES PATENTS

| | | | |
|---|---|---|---|
| 3,402,873 | 9/1968 | Lauterbach | 156—69 X |
| 3,454,450 | 7/1969 | Tyrrell | 156—583 X |
| 3,459,610 | 8/1969 | Dijkers et al. | 156—306 X |
| 3,491,509 | 1/1970 | Wright | 53—39 |

CARL D. QUARFORTH, Primary Examiner

R. L. TATE, Assistant Examiner

U.S. Cl. X.R.

53—39; 156—292, 306